United States Patent
Holstine et al.

(10) Patent No.: US 11,286,052 B2
(45) Date of Patent: Mar. 29, 2022

(54) DROGUE PARACHUTE ASSEMBLIES WITH ELASTOMERIC INSERT SLEEVES

(71) Applicant: AMI Industries, Inc., Colorado Springs, CO (US)

(72) Inventors: Steve Holstine, Colorado Springs, CO (US); Kassidy L. Carson, Colorado Springs, CO (US); John Hampton, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 22 days.

(21) Appl. No.: 16/983,496

(22) Filed: Aug. 3, 2020

(65) Prior Publication Data

US 2022/0033095 A1 Feb. 3, 2022

(51) Int. Cl.
*B64D 17/38* (2006.01)
*B64D 17/76* (2006.01)
*B64D 25/10* (2006.01)

(52) U.S. Cl.
CPC ........... *B64D 17/76* (2013.01); *B64D 17/386* (2013.01); *B64D 25/10* (2013.01)

(58) Field of Classification Search
CPC ........ B64D 17/38; B64D 17/76; B64D 25/10; B64D 17/386
See application file for complete search history.

(56) References Cited

U.S. PATENT DOCUMENTS

| 2,520,931 | A | 9/1950 | Helmut |
| 3,508,727 | A | 4/1970 | Willems |
| 3,887,151 | A | 6/1975 | Matsuo |
| 4,264,311 | A | 4/1981 | Call et al. |
| 6,565,041 | B1 | 5/2003 | Young et al. |
| 7,584,927 | B2 | 9/2009 | Giles, III |
| 9,669,946 | B2 | 6/2017 | McDonnell et al. |
| 2001/0050323 | A1 | 12/2001 | Brownell |
| 2009/0038530 | A1* | 2/2009 | Truong ................. B63B 21/48 114/382 |
| 2015/0377598 | A1 | 12/2015 | Runck |
| 2017/0327236 | A1* | 11/2017 | Mastrolia ............. B64D 17/386 |
| 2019/0344897 | A1 | 11/2019 | Reasner et al. |
| 2020/0094972 | A1 | 3/2020 | Volny et al. |

(Continued)

FOREIGN PATENT DOCUMENTS

| FR | 757245 | 12/1933 |
| FR | 779990 | 4/1935 |

(Continued)

OTHER PUBLICATIONS

USPTO, Pre-Interview First Office Action dated Oct. 4, 2021 in U.S. Appl. No. 16/983,459.

(Continued)

*Primary Examiner* — Justin M Benedik

(74) *Attorney, Agent, or Firm* — Snell & Wilmer L.L.P.

(57) ABSTRACT

A multi-staged drogue parachute assembly may include a suspension line having a primary length and a secondary length. The primary length may be deployable upon a first deployment of the multi-staged drogue parachute assembly. The secondary length may be prevented from deployment until the primary length has fully deployed. An attenuator may attach a first portion of the secondary length to a second portion of the secondary length.

20 Claims, 13 Drawing Sheets

(56) References Cited

U.S. PATENT DOCUMENTS

| | | | |
|---|---|---|---|
| 2020/0094973 A1 | 3/2020 | Volny et al. | |
| 2020/0094974 A1 | 3/2020 | Volny et al. | |
| 2020/0094975 A1 | 3/2020 | Volny et al. | |
| 2020/0156797 A1* | 5/2020 | Volny | B64D 17/76 |
| 2020/0223551 A1* | 7/2020 | Volny | B64D 17/346 |

FOREIGN PATENT DOCUMENTS

| | | |
|---|---|---|
| FR | 2513717 | 4/1983 |
| GB | 118860 | 9/1918 |

OTHER PUBLICATIONS

USPTO, Notice of Allowance dated Dec. 6, 2021 in U.S. Appl. No. 16/983,459.
United Kingdom Intellectual Property Office, United Kingdom Search Report dated Jan. 19, 2022 in Application No. GB2111200.8.

\* cited by examiner

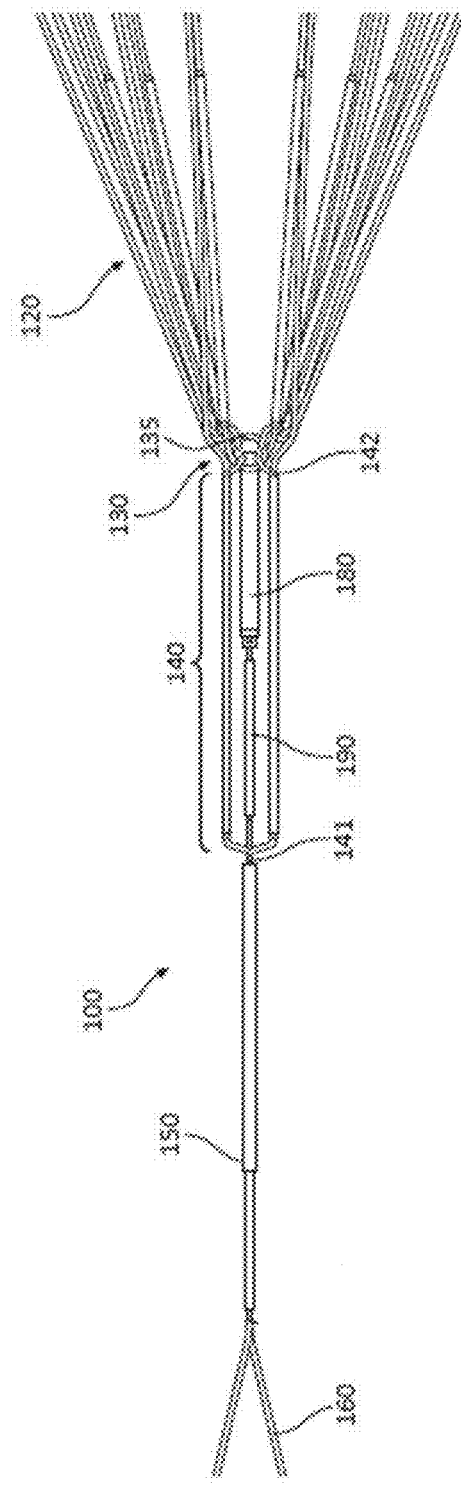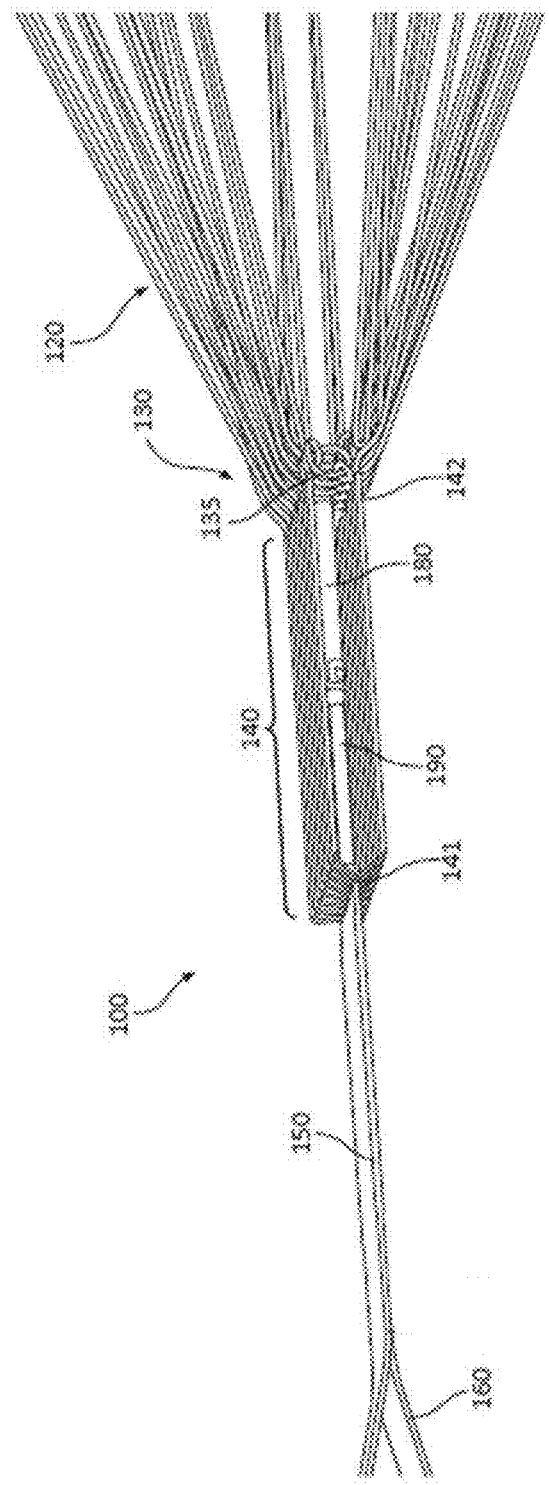
FIG. 3A
FIG. 3B

DROGUE PARACHUTE ASSEMBLIES WITH ELASTOMERIC INSERT SLEEVES

FIELD

The present disclosure relates to parachute assemblies, and more specifically, to drogue parachute assemblies having elastomeric insert sleeves and methods of forming the same.

BACKGROUND

During ejection events, an ejection seat may be propelled from an aircraft cockpit. The ejection seats may include parachute systems configured to reduce the velocity of the ejection seat and its occupant and deliver the seat and/or the occupant safely to land or sea. The parachute systems may include a drogue parachute, which may deploy rapidly in response to expulsion of the ejection seat from the cockpit. The drogue parachute may decelerate and stabilize the ejection seat to enable safe deployment of a main parachute.

Drogue parachutes typically comprise a canopy, risers, and suspension lines. The canopy may increase drag, the suspension lines may connect the canopy to the risers, and the risers may attach the parachute to the person and/or object (e.g., ejection seat) being ejected. Drogue parachutes may be configured for staged deployment. For example, at a first deployment stage, the drogue parachute deploys to a first length and at a second deployment stage, additional suspension line length is released and the drogue parachute deploys to a second, longer length. Release of the additional suspension line length tends to create a "lull," or reduction, in deceleration force followed by a rapid increase, or "spike," in force exerted on the object attached to the risers. The rate of change in force during the spike can lead to injury and/or other damage to the object.

SUMMARY

A multi-staged drogue parachute assembly is disclosed herein. In accordance with various embodiments, the multi-staged drogue parachute assembly may comprise a suspension line including a primary length and a secondary length. The secondary length may be folded and an elastomeric insert may be coupled between a first portion of the secondary length and a second portion of the secondary length. A sleeve may be coupled to the primary length of the suspension line. The sleeve may include a first sleeve section and a second sleeve section. The first portion of the secondary length and the second portion of the secondary length may be located with an interior volume defined by the first sleeve section and the second sleeve section.

In various embodiments, a bundling line is coupled to the suspension line. The bundling line may be configured to secure the secondary length. The multi-staged drogue parachute assembly may further include a cutter configured to sever the bundling line and release the secondary length.

In various embodiments, a first thread may couple the first sleeve section and the second sleeve section to the primary length. A second thread may couple the first sleeve section to the second sleeve section.

In various embodiments, a thread may couple at least one of the first sleeve section or the second sleeve section to the primary length. The sleeve may be folded to form an apex connecting the first sleeve section and the second sleeve section. In various embodiments, at least a portion of the elastomeric insert is located within an internal volume of the secondary length.

In various embodiments, a first thread may couple a first segment of the elastomeric insert to the first portion of the secondary length, and a second thread may couple a second segment of the elastomeric insert to the second portion of the secondary length. In various embodiments, a third segment of the elastomeric insert is located external to the suspension line. The third segment may extend between the first segment and the second segment.

In various embodiments, the elastomeric insert includes a first segment located within an internal volume of the suspension line, a second segment located within the internal volume of the suspension line, a third segment located external to the suspension line and extending between the first segment and the second segment, a fourth segment located external to the suspension line and extending from the first segment to a first end of the elastomeric insert, and a fifth segment located external to the suspension line and extending from the second segment to a second end of the elastomeric insert.

In various embodiments, the fourth segment is coupled to the suspension line by at least one of an adhesive or a heat bonding. In various embodiments, the fourth segment includes at least one of a crimp or a knot configured to block the fourth segment from translating into the internal volume of the secondary length.

An ejection system is also disclosed herein. In accordance with various embodiments, the ejection system may comprise an ejection seat and a multi-staged drogue parachute assembly coupled to the ejection seat. The multi-staged drogue parachute assembly may comprise a canopy, a suspension line coupled to the canopy, and a riser coupled between the suspension line and the ejection seat. The suspension line includes a primary length and a secondary length. The secondary length may be folded. The multi-staged drogue parachute assembly may further comprise an elastomeric insert coupled between a first portion of the secondary length and a second portion of the secondary length, and a sleeve coupled to the primary length of the suspension line. The sleeve includes a first sleeve section and a second sleeve section. The first portion of the secondary length and the second portion of the secondary length are located with an interior volume defined by the first sleeve section and the second sleeve section.

In various embodiments, the multi-staged drogue parachute assembly may further comprise a bundling line coupled to the suspension line and a cutter configured to sever the bundling line and release the secondary length. The bundling line may be configured to secure the secondary length.

In various embodiments, the multi-staged drogue parachute assembly may further comprise a first thread coupling at least one of the first sleeve section or the second sleeve section to the primary length, and a second thread coupling the first sleeve section to the second sleeve section.

In various embodiments, the multi-staged drogue parachute assembly may further comprise a thread coupling at least of the first sleeve section or the second sleeve section to the primary length. The sleeve may be folded to form an apex connecting the first sleeve section and the second sleeve section.

In various embodiments, at least a portion of the elastomeric insert is located within an internal volume of the secondary length.

A method of testing a multi-staged drogue parachute assembly is also disclosed herein. In accordance with various embodiments, the method may comprise deploying a primary length of a suspension line of the multi-staged drogue parachute assembly. The multi-staged drogue parachute assembly may include the suspension line, an elastomeric insert, and a sleeve. The suspension line may comprise the primary length and a secondary length. The elastomeric insert may be coupled between a first portion of the secondary length and a second portion of the secondary length. The sleeve may be coupled to the primary length of the suspension line. The sleeve may include a first sleeve section and a second sleeve section. The first portion of the secondary length and the second portion of the secondary length may be located with an interior volume defined by the first sleeve section and the second sleeve section during deployment of the primary length of the suspension line. The method may further include increasing a tensile load applied to the sleeve, severing a coupling between the first sleeve section and the second sleeve section in response to the tensile load applied to the sleeve exceeding a threshold tensile load, and deploying the secondary length of the suspension line.

In various embodiments, the method may further comprise severing a bundling line coupled to the primary length of the suspension line. In response to severing the bundling line, the tensile load may be applied to the sleeve by the secondary length of the suspension line.

In various embodiments, the coupling between the first sleeve section and the second sleeve section comprises a first thread sewn between the first sleeve section and the second sleeve section. In various embodiments, the multi-staged drogue parachute assembly may further comprise a second thread sewn between the primary length of the suspension line and at least one of the first sleeve section or the second sleeve section.

In various embodiments, severing the coupling between the first sleeve section and the second sleeve section may comprise severing a thread sewn between the primary length of the suspension line and at least one of the first sleeve section or the second sleeve section.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 3A illustrates a side view of a bundling confluence, in accordance with various embodiments;

FIG. 3B illustrates a perspective side view of the bundling confluence of FIG. 3A, in accordance with various embodiments;

Figure 1:
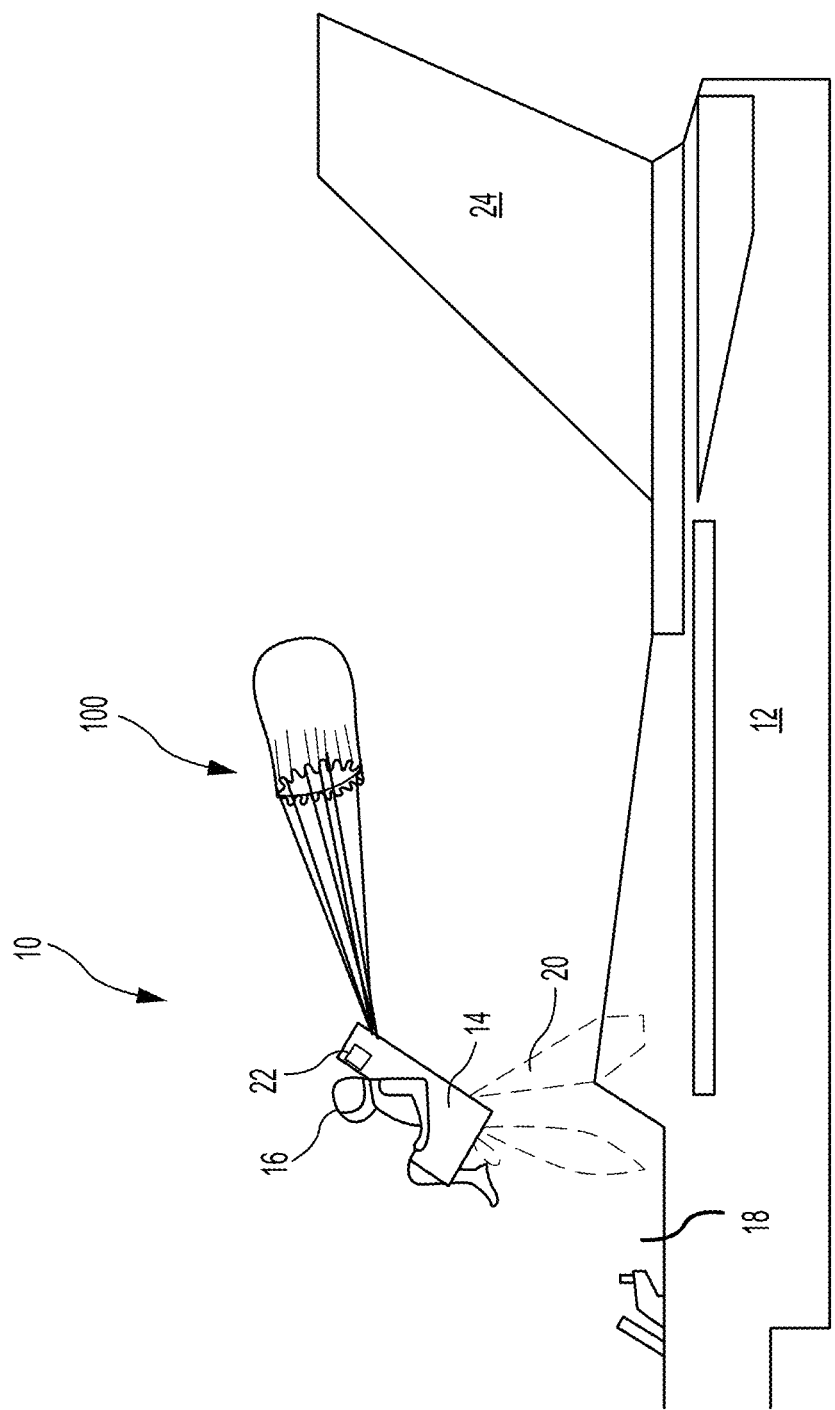
FIG. 1 illustrates an ejection seat being launched from an aircraft cockpit, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is a multi-staged drogue parachute assembly including suspension line attenuators. In accordance with various embodiments, the suspension line attenuators include elastomeric inserts coupled to the suspension lines of the drogue parachute assembly. The elastomeric inserts may be coupled to a secondary length of the suspension line, which is configured to be stowed during a first stage of deployment of the drogue parachute assembly. In accordance with various embodiments, the elastomeric insert and the secondary length of the suspension line may be stored with a sleeve attached to the suspension line. The sleeve may include stitching (e.g., a thread) configured to sever in response to a threshold tensile load. Severing the stitching opens the sleeve and allows the secondary length to deploy. The elastomeric inserts may absorb, at least, some of the load generated in response to the secondary length being deployed. In this regard, the elastomeric inserts may reduce or eliminate a lull (or drop) in tensile force through the suspension lines immediately after release of the secondary length, thereby decreasing the rate of change in force exerted on the object supported by multi-staged drogue parachute assembly.

With reference to FIG. 1, an aircraft ejection system 10 is shown, in accordance with various embodiments. Aircraft ejection system 10 may be installed in aircraft 12 to safely expel ejection seat 14 and an occupant 16 of ejection seat 14 from cockpit 18 of aircraft 12. Ejection seat 14 may be urged from cockpit 18 by a propulsion system 20. Aircraft ejection system 10 may include a multi-staged drogue parachute assembly 100. Multi-staged drogue parachute assembly 100 may be configured to deploy a predetermined time after initiation of the ejection sequence. Multi-staged drogue parachute assembly 100 may decelerate and stabilize the ejection seat 14 prior to deployment of a main parachute assembly 22, which may be located, at least partially, within ejection seat 14.

Figure 2A:
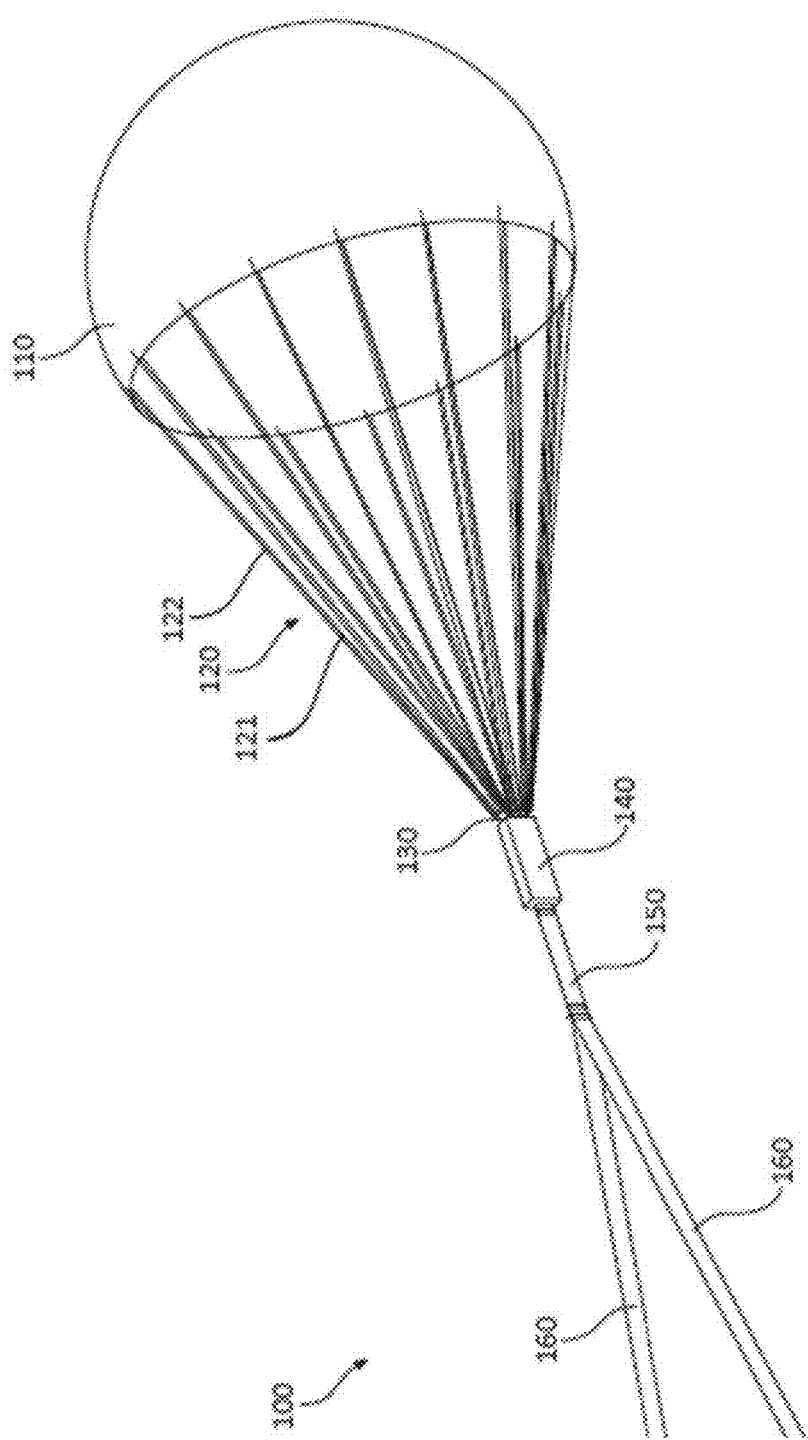
FIG. 2A illustrates a perspective view of a multi-staged drogue parachute deployed to a first length, in accordance with various embodiments.
Figure 2B:
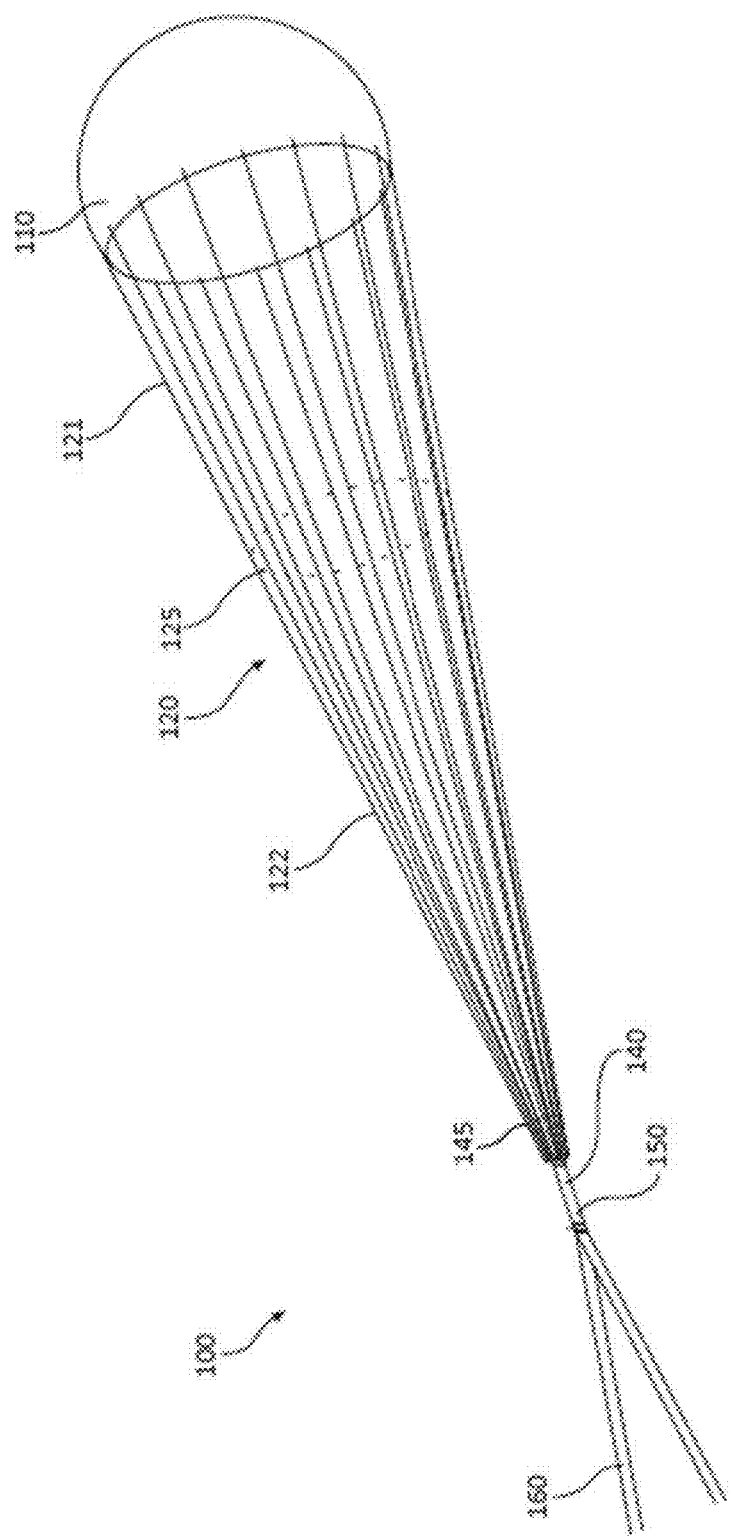
FIG. 2B illustrates a perspective view of a multi-staged drogue parachute deployed to a second length, in accordance with various embodiments.

With reference to FIGS. 2A and 2B, multi-staged drogue parachute assembly 100 is illustrated deployed to a first length (FIG. 2A) and to a second, longer length (FIG. 2B). Multi-staged drogue parachute assembly 100 may comprise a canopy 110, suspension lines 120, a bundle 130, a bundling confluence 140, a confluence 150, and risers 160.

Upon deployment of multi-staged drogue parachute assembly 100, canopy 110 may deploy to increase drag, or otherwise decelerate, ejection seat 14. Canopy 110 may comprise any suitable type of canopy and any suitable type of material, such as, for example, canvas, silk, nylon, aramid fiber (e.g., KEVLAR®), polyethylene terephthalate, and/or the like. Suspension lines 120 may be coupled to canopy 110 using any suitable attachment technique, such as, for example, through stitching. Suspension lines 120 may be configured to at least partially stabilize deployed canopy 110. The suspension lines 120 may be weaved or otherwise bound to one another to form risers 160. In this regard, suspension lines 120 and risers 160 connect ejection seat 14 to canopy 110. Suspension lines 120 may be weaved or otherwise bound to one another to form risers 160 through confluence 150 and bundling confluence 140. Suspension lines 120 and/or risers 160 may comprise any suitable material. For example, suspension lines 120 and/or risers 160 may comprise a tubular braided material that constricts in diameter under tension, such as, for example, nylon, aramid fiber (e.g., KEVLAR®), and/or the like.

Multi-staged drogue parachute assembly 100 may be configured to enable multi-staged deployment of suspension lines 120, wherein after deployment of suspension lines 120 to a first length, suspension lines 120 may release to a second, longer overall length. The staged deployment of suspension lines 120 allows multi-staged drogue parachute assembly 100 to have a first deployment stage comprising the first length (as shown FIG. 2A) to provide clearance over aircraft obstacles (such as aircraft tail 24 in FIG. 1), and to have a second deployment stage comprising the second length (as shown in FIG. 2B) for added parachute stability. Deploying at the first length may reduce opening shock in multi-staged drogue parachute assembly 100 while achieving an earlier suspension line stretch.

Suspension lines 120 may each comprise a primary length 121 and a secondary length 122. When multi-staged drogue parachute assembly 100 is deployed to the first length, as shown in FIG. 2A, primary length 121 may extend from bundle 130 to canopy 110. In this regard, primary length 121 may comprise the portion of suspension line 120 that is deployed during the first deployment stage of multi-staged drogue parachute assembly 100. Secondary length 122 may comprise a portion of suspension line 120 that is deployed during the second deployment stage of multi-staged drogue parachute assembly 100. Stated differently, secondary length 122 comprises a portion of suspension line 120 that is stowed and does not experience a tensioning force during the first deployment stage of multi-staged drogue parachute assembly 100.

Confluence 150 may be configured to connect suspension lines 120 from bundling confluence 140 to risers 160. In various embodiments, confluence 150 may comprise an area of multi-staged drogue parachute assembly 100 wherein suspension lines 120 are bound together. Suspension lines 120 may pass through bundling confluence 140 and may be bound together in confluence 150 via weaving, stitching, and/or through any other suitable method. In various embodiments, multi-staged drogue parachute assembly 100 may comprise a greater number of suspension lines 120 as compared to the number of risers 160. Each riser 160 may be coupled to any number of suspension lines 120, such as, for example, 1 to 16 suspension lines 120 per riser 160, or 8 to 16 suspension lines 120 per riser 160. In various embodiments, each riser 160 may couple to 8 suspension lines 120.

Figure 3C:
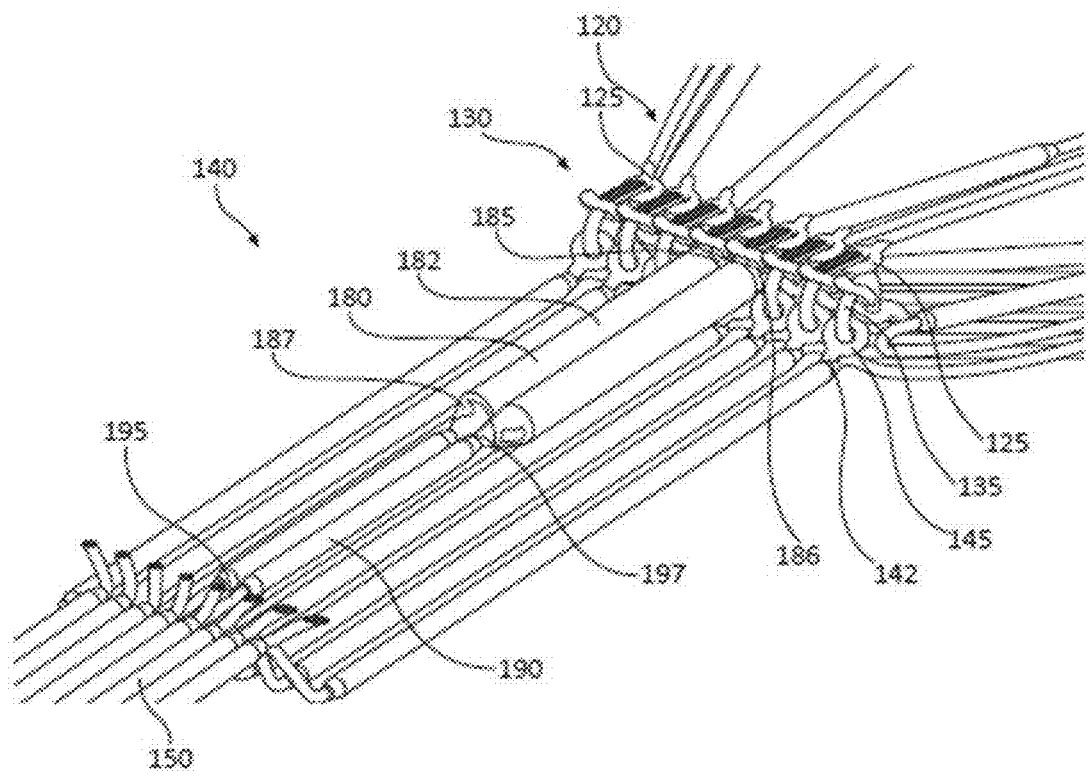
FIG. 3C illustrates a perspective view of a cutter in the bundling confluence of FIGS. 3A and 3B, in accordance with various embodiments.

With reference to FIGS. 3A, 3B, and 3C, bundling confluence 140 is depicted in greater detail, in accordance with various embodiments. Bundling confluence 140 may comprise a confluence (or first) end 141 and a suspension (or second) end 142. Confluence end 141 may connect bundling confluence 140 to confluence 150. Suspension end 142 may connect bundling confluence 140 to bundle 130. Bundling confluence 140 may comprise one or more cutter(s) 180 and matching cutter pin puller(s) 190. For example, as depicted in FIG. 3C, bundling confluence 140 comprises two cutters 180 and two corresponding cutter pin pullers 190 (e.g., the second cutter 180 and corresponding cutter pin puller 190 may be included for redundancy).

Cutter 180 may be configured to sever a bundling line 135 of bundle 130, thereby releasing secondary length 122 of suspension line 120. In this regard, cutter 180 severing bundling line 135 may initiate the second deployment stage of multi-staged drogue parachute assembly 100. Cutter 180 may comprise a pin end 187 and a head end 185 concealed within a cutter sleeve 182. Cutter sleeve 182 may comprise the same material as suspension lines 120 and risers 160, and/or any other suitable material, and may be configured to enclose components of cutter 180. Pin end 187 may be connected to a first end 197 of cutter pin puller 190. Cutter 180 includes a severing device (for example, a blade, hammer, striker, bolt, shape charge, or the like) configured to sever bundling line 135. The severing device may be located within cutter sleeve 182. Cutter pin puller 190 may be configured to pull pin end 187 of cutter 180 during and/or after the first deployment stage of multi-staged drogue parachute assembly 100. For example, a second end 195 of cutter pin puller 190 may be connected to bundling confluence 140. Cutter pin puller 190 may pull pin end 187 in response to tension imparted by bundling confluence 140 during deployment. In various embodiments, cutter pin puller 190 may be coupled to suspension line 120 at second end 195, such that cutter pin puller 190 is configured to pull pin end 187 in response to tension imparted by suspension line 120. In response to pin end 187 being pulled, the severing device may translate towards head end 185 of cutter 180. In various embodiments, pulling pin end 187 may create an explosive charge, or may release a mechanical spring, configured to translate severing device towards head end 185 and bundling line 135. In that regard, bundling line 135 may pass through an aperture 186 of head end 185. The severing device may pass through aperture 186 to sever bundling line 135.

Figure 4:
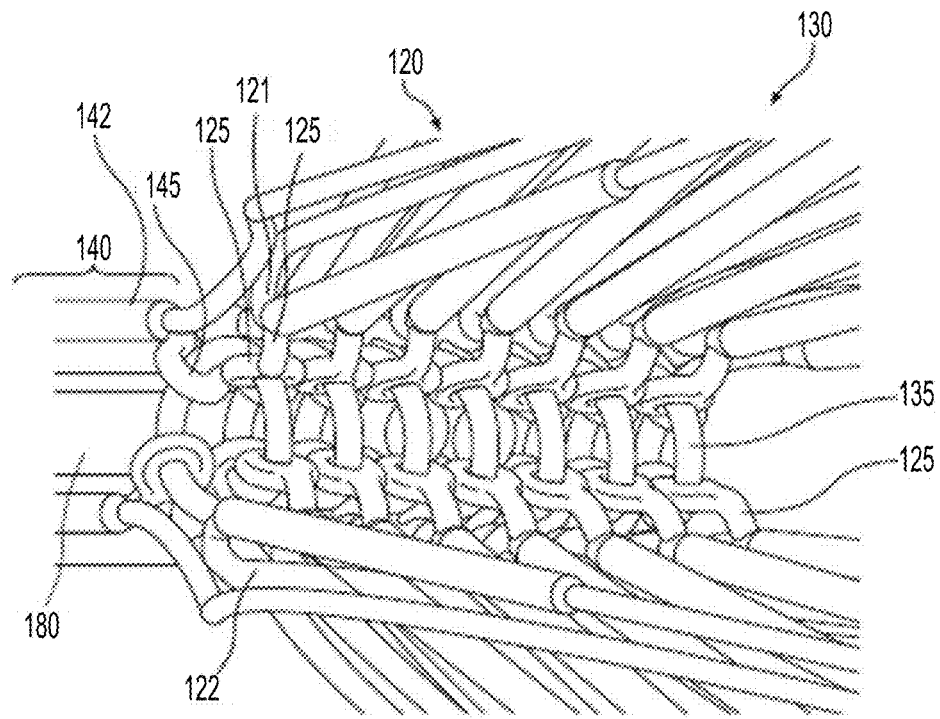
FIG. 4 illustrates a perspective view of a bundle, in accordance with various embodiments.

With reference to FIG. 4, bundle 130 is depicted in greater detail. In various embodiments, bundle 130 may be configured as a central point for securing and deploying secondary length 122 of suspension lines 120. Bundle 130 may comprise bundling line 135. Bundling line 135 may be configured to couple and/or secure a first end 152 of primary length 121 of suspension line 120 to suspension end 142 of bundling confluence 140. In various embodiments, multi-staged drogue parachute assembly 100 may comprise confluence loops 145 configured to couple bundling confluence 140 to bundling line 135. Confluence loops 145 may be formed by, or otherwise attached to, suspension end 142 of bundling confluence 140. Multi-staged drogue parachute assembly 100 may further comprise suspension loops 125 configured to couple primary length 121 to bundling line 135. Suspension loop 125 may be formed by, or otherwise attached to, first end 152 of each primary length 121. In various embodiments, bundling line 135 may be configured to pass through confluence loops 145 and suspension loops 125 to secure first end 152 of primary length 121 to bundle 130. In various embodiments, the configuration of bundling line 135 may comprise any suitable shape, size, and/or design suitable to route bundling line 135 through confluence loops 145 and suspension loops 125. For example, bundling line 135 may comprise a helical pattern, a zig-zag pattern, and/or any other suitable pattern. In response to bundling line 135 being severed by cutter 180, first end 152 of primary length 121 may translate away from bundling confluence 140. Prior to severing bundling line 135, bundle 130 may reduce or prevent tension from being imparted into the secondary lengths 122 of suspension lines 120. Upon bundling line 135 being severed (i.e., being uncoupled from suspension loops 125 and/or from confluence loops 145), tension may be applied to the secondary lengths 122.

Figure 5:
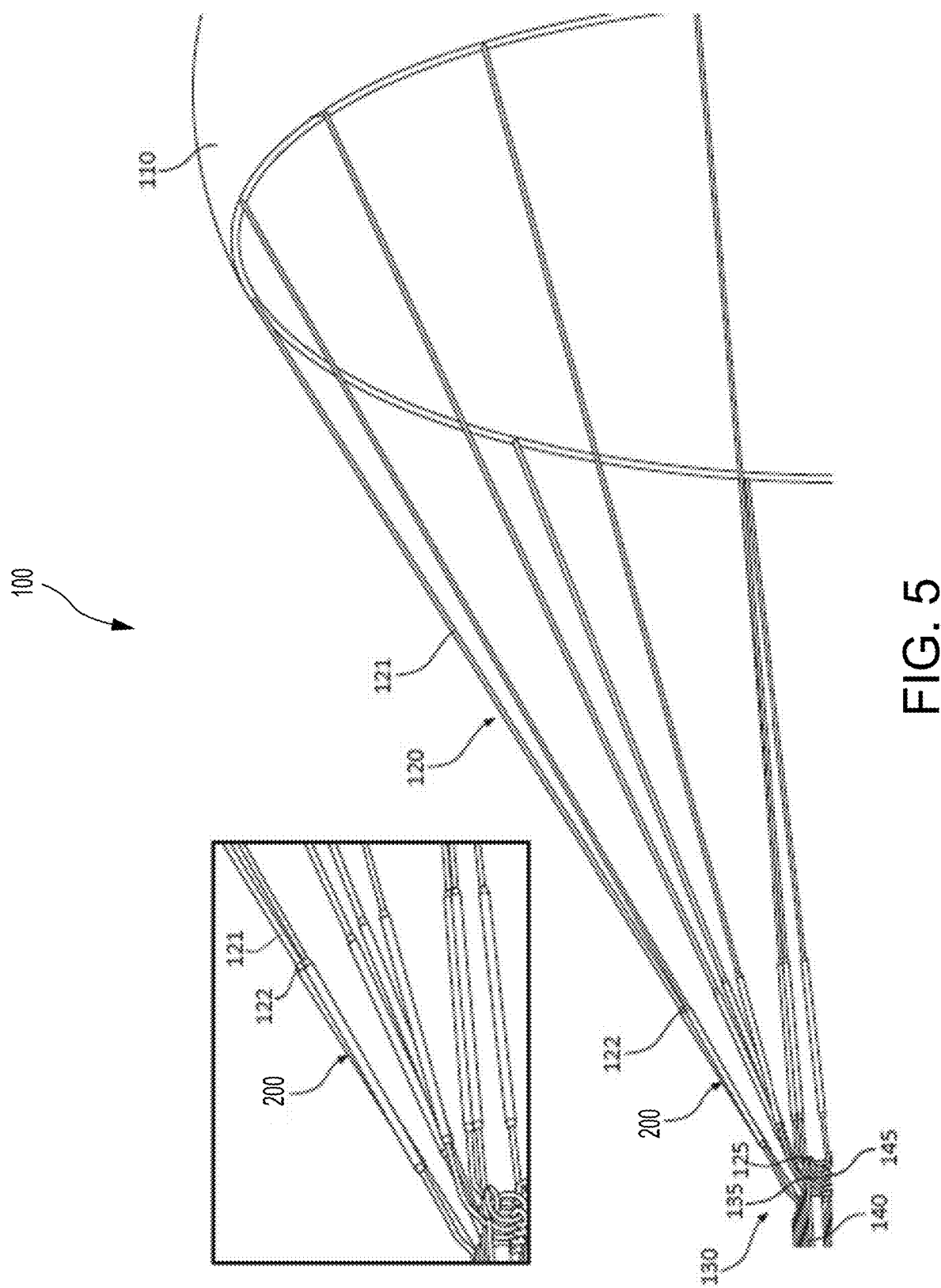
FIG. 5 illustrates a multi-staged drogue parachute deployed to a first length with the secondary length of the suspension lines located within a sleeve, in accordance with various embodiments.

With reference to FIG. 5, in accordance with various embodiments, secondary length 122 of suspension line 120 may be stowed in a sleeve 200. In that regard, secondary length 122 of suspension line 120 may be located in sleeve 200 to prevent entanglement of secondary length 122 of suspension line 120 prior to, and during, the first deployment stage (and/or second deployment stage) of multi-staged drogue parachute assembly 100. In various embodiments, sleeve 200 may comprise a full-length continuous sleeve spanning from bundle 130 to canopy 110. In further embodiments, sleeve 200 may comprise any other suitable length capable of storing secondary length 122 of suspension line 120.

Figure 6A:
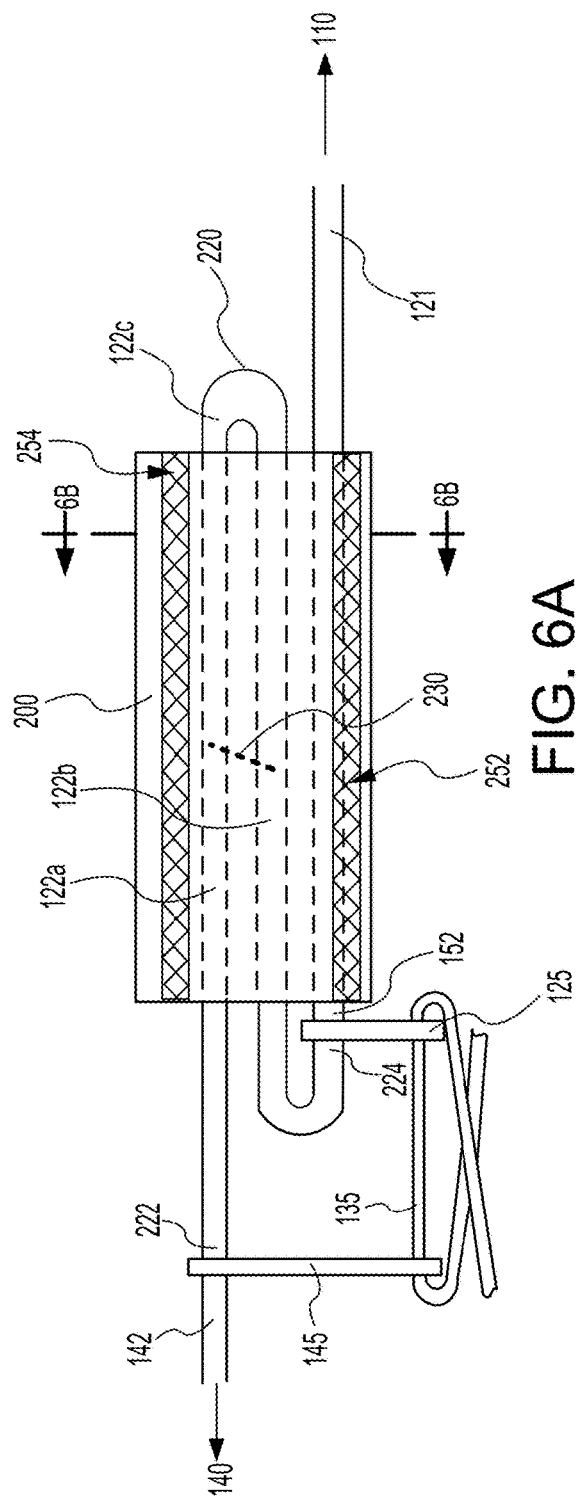
FIGS. 6A and 6B illustrate a suspension line having a secondary length located within a sleeve and including an elastomeric insert, in accordance with various embodiments.
Figure 6B:
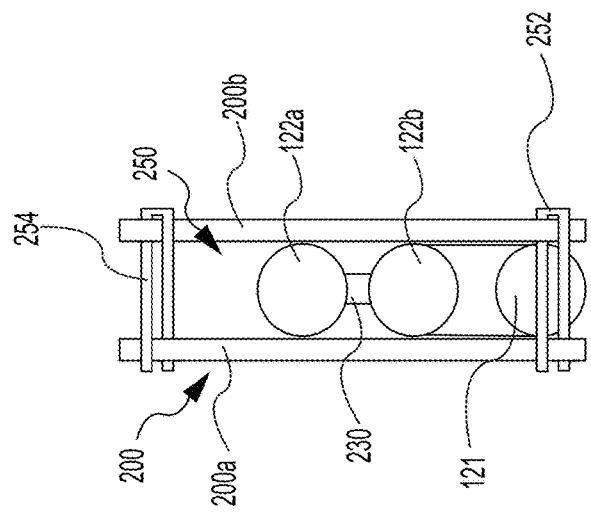

With reference to FIGS. 6A and 6B, additional details of sleeve 200 are illustrated. In various embodiments, secondary length 122 may be folded on itself such that a first portion 122a of secondary length 122 is adjacent to and/or contacting a second portion 122b of secondary length 122. In various embodiments, an elastomeric insert 230 may be coupled between first portion 122a and second portion 122b of secondary length 122.

Folded secondary length 122 may include an apex 220, which may be formed by a third portion 122c of secondary length 122. First portion 122a of secondary length 122 extends to a first end 222 of secondary length 122, and second portion 122b of secondary length 122 extends to a second end 224 of secondary length 122. First end 222 of secondary length 122 is located proximate bundling confluence 140 and confluence loops 145. For example, one or more confluence loop(s) 145 may be formed, or otherwise attached, between first end 222 of secondary length 122 and suspension end 142 of bundling confluence 140. Second end 224 of secondary length 122 is located proximate primary length 121 and suspension loop 125. For example, one or more suspension loop(s) 125 may be formed, or otherwise attached, between second end 224 of secondary length 122 and first end 152 of primary length 121. In this regard, first portion of secondary length 122 extends from first end 222 of secondary length 122 to third portion 122c of secondary length 122. Third portion 122c extends between first portion 122a and second portion 122b of secondary length 122 and forms apex 220 when secondary length 122 is folded on itself. Second portion 122b extends from third portion 122c to second end 224 of secondary length 122.

Figure 7:
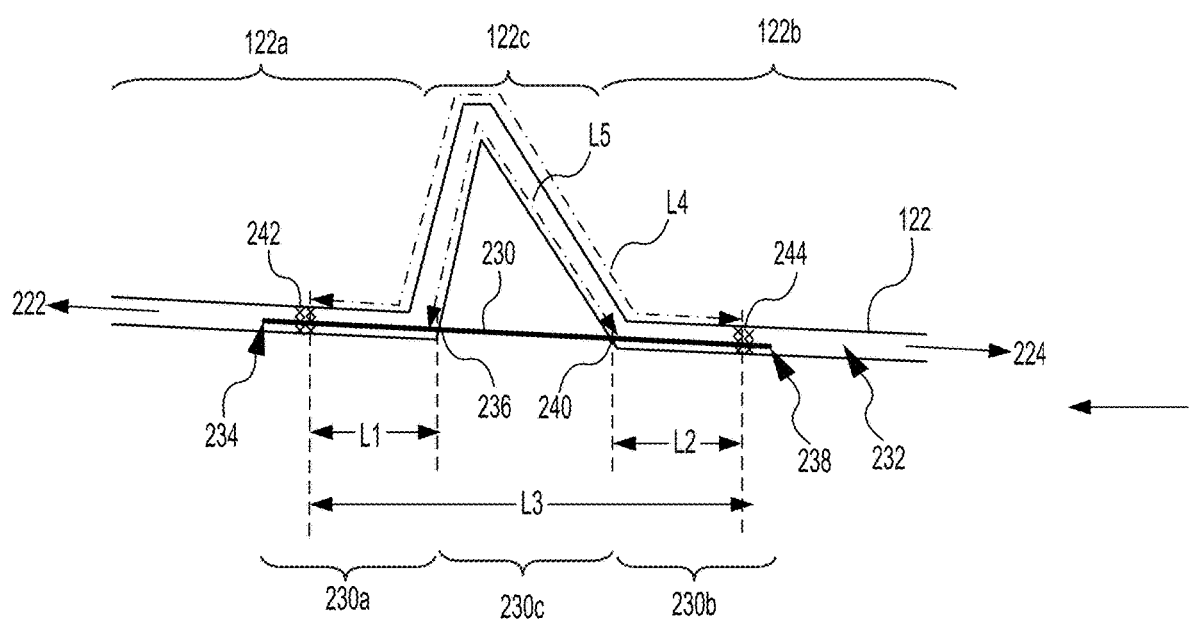
FIG. 7 illustrates a portion of a suspension line having an elastomeric insert coupled via stitching, in accordance with various embodiments.

With reference to FIG. 7, additional details of elastomeric insert 230 are illustrated. Elastomeric insert 230 may comprise a relatively flexible and/or elastomeric material such as such as, for example, rubber, synthetic rubber, silicone, or a polyether-polyurea copolymer such as Lycra®, Spandex, and/or Elastane. In various embodiments, elastomeric insert 230 may comprise a tension spring. In various embodiments, secondary length 122 of suspension line 120 comprises a tubular, braided material and, at least, a portion of elastomeric insert 230 may be located in an internal volume 232 of secondary length 122 of suspension line 120. For example, a first segment 230a and a second segment 230b of elastomeric insert 230 may be located in internal volume 232 and a third segment 230c may be located outside (i.e., exterior to) internal volume 232. First segment 230a extends from a first end 234 of elastomeric insert 230 to an opening 236 in secondary length 122. Second segment 230b extends from a second end 238 of elastomeric insert 230 to an opening 240 in secondary length 122. Third segment 230c extends between opening 236 and opening 240 (i.e., between first segment 230a and second segment 230b). In this regard, secondary length 122 of suspension line 120 includes first portion 122a extending from opening 236 to first end 222, second portion 122b extending between opening 240 and second end 224, and third portion 122c extending between opening 236 and opening 240. Elastomeric insert 230 may be located external to third portion 122c.

In various embodiments, first segment 230a of elastomeric insert 230 may be coupled to secondary length 122 via stitching 242 (e.g., via a thread sewn through the first segment 230a of elastomeric insert 230 and secondary length 122). Second segment 230b of elastomeric insert 230 may be coupled to secondary length 122 via stitching 244

(e.g., via a thread sewn through second segment 230b of the elastomeric insert 230 and secondary length 122. In various embodiments, a length L1 of elastomeric insert 230 is at least 6.0 inches (15.24 cm). Length L1 is measured between stitching 242 and opening 236. A length L2 of elastomeric insert 230, extending between stitching 244 and opening 240, is at least 6.0 inches (15.24 cm). In accordance with various embodiments, when elastomeric insert 230 is in a non-extended stated, a length L3 of elastomeric insert 230, as measured between stitching 242 and stitching 244, is less than a length L4 of secondary length 122, as measured between stitching 242 and stitching 244. In accordance with various embodiments, as tension in secondary length 122 increases (i.e., response to severing of bundling line 135) first end 234, stitching 242, and opening 236 translate away from second end 238, stitching 244, and opening 240, thereby causing elastomeric insert 230 to stretch and the length L3 of elastomeric insert 230 to increase. The material and length of elastomeric insert 230 are selected such that elastomeric insert 230 can stretch to the length L4 of secondary length 122 without breaking (i.e., length L3 may equal length L4). Stated differently, the length L5 of the third portion 122c of secondary length 122 (i.e., the length of secondary length 122 extending from opening 236 to opening 240) is equal to or less than the difference between the length L3 of elastomeric insert 230 in the unstretched stated and the length L3 of elastomeric insert 230 in the fully stretched state.

Elastomeric insert 230 may reduce the force experienced by an occupant or object during payout of secondary length 122. Elastomeric insert 230 also reduces the peak load imparted on the secondary length 122 before equilibrium of the suspension lines 120 is reached. Stated differently, should the opening of canopy 110 cause force to be applied to the suspension lines 120 unequally, elastomeric insert 230 tends to reduce the maximum load applied to its respective suspension line 120 (i.e. the suspension line 120 to which the elastomeric insert 230 is coupled) prior to the force being equalized or balanced across all of the suspension lines 120.

Returning to FIG. 6B, in accordance with various embodiments, sleeve 200 may include a first sleeve section 200a and a second sleeve section 200b. First sleeve section 200a and second sleeve section 200b may define an interior sleeve volume 250. At least a portion of secondary length 122 and primary length 121 may be located in interior sleeve volume 250. For example, in various embodiments, first portion 122a, second portion 122b, and third portion 122c may be located, at least, partially within interior sleeve volume 250 of sleeve 200. In various embodiments, sleeve 200 may be coupled to suspension line 120 via a first thread 252. First thread 252 may couple first sleeve section 200a and second sleeve section 200b to primary length 121. While FIG. 6B shows first thread 252 extending through first sleeve section 200a, primary length 121, and second sleeve section 200b, it is contemplated and understood that, in various embodiments, a first thread may be sewn between first sleeve section 200a and a first side of primary length 121, and a second thread may be sewn between second sleeve section 200b and a second, opposing side of primary length 121.

In accordance with various embodiments, a second thread 254 may be sewn between first sleeve section 200a and second sleeve section 200b. In accordance with various embodiments, second thread 254 may be configured to sever in response to tensile force generated during extension of secondary length 122. A tensile strength of second thread 254 is less than the force generated by secondary length 122 in response to the severing of bundling line 135. In this regard, second thread 254 is configured break in response to the severing of bundling line 135. Stated differently, in response to severing the bundling line 135, the tensile load applied to the sleeve 200 by the secondary length 122 of suspension line 120 severs second thread 254. In response to second thread 254 severing, first sleeve section 200a may translate away from second sleeve section 200b, thereby removing the frictional forces that hold secondary length 122 within sleeve 200. In this regard, secondary length 122 may translate out interior sleeve volume 250 in response to the breaking of second thread 254.

Opening sleeve 200 (i.e., separating first sleeve section 200a from second sleeve section 200b) may allow secondary length 122 to more easily release. Further, sewing first sleeve section 200a to second sleeve section 200b after locating secondary length 122 between first sleeve section 200a and second sleeve section 200b allows for easier assembly, as compared to conventional assembly methods where the secondary length is pulled through a sleeve that is already formed and attached to the primary length. Sewing first sleeve section 200a to second sleeve section 200b after locating secondary length 122 between first sleeve section 200a and second sleeve section 200b also tends to better accommodate the additional thickness created by elastomeric insert 230, which may not fit into preformed, pre-sewn sleeves and/or may become tangled when pulling the secondary length through a preformed, pre-sewn sleeve.

Figure 8A:
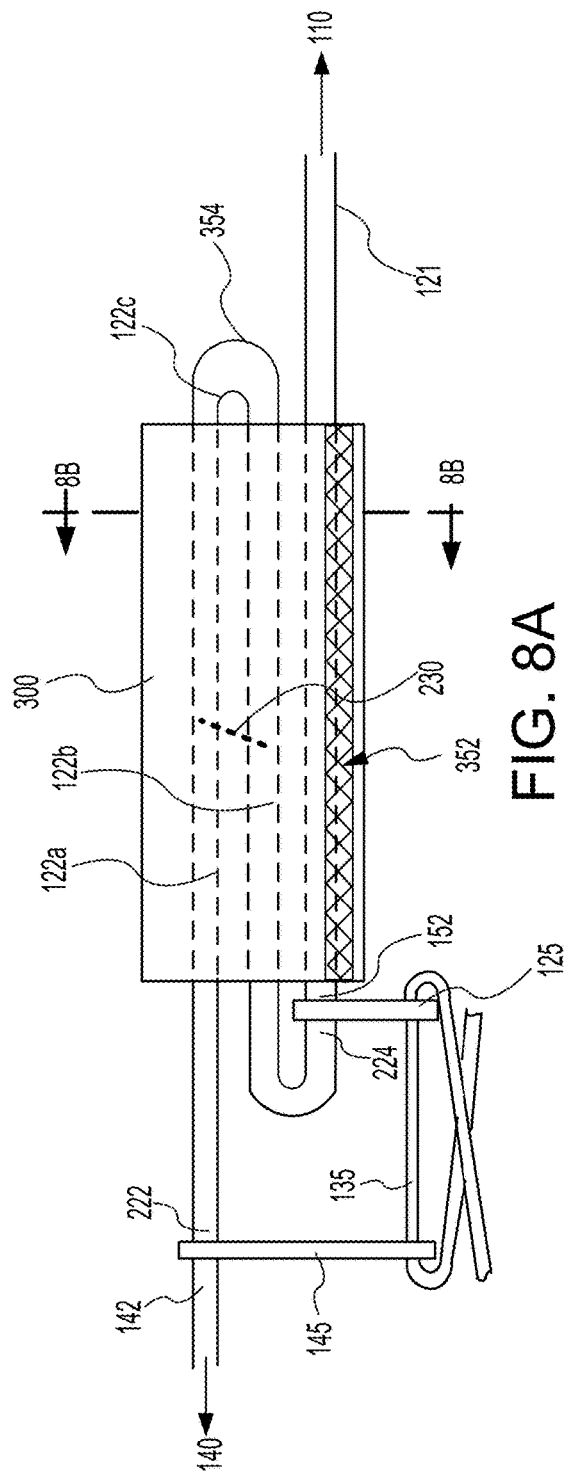
FIGS. 8A and 8B illustrate a suspension line having a secondary length located within a sleeve and including an elastomeric insert, in accordance with various embodiments.
Figure 8B:
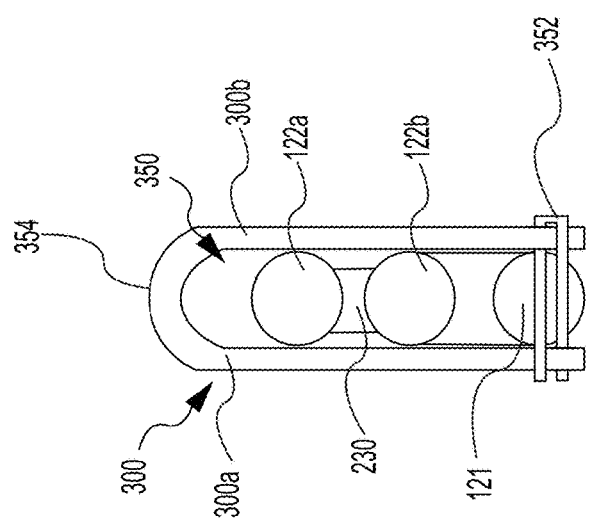

Referring to FIGS. 8A and 8B, a sleeve 300 for housing secondary length 122 is illustrated. In various embodiments, sleeve 300 may replace one or more sleeves 200 in FIG. 5. Sleeve 300 may be folded on itself. Folding sleeve 300 may form a first sleeve section 300a, a second sleeve section 300b, and an apex 354. Apex 354 may connect first sleeve section 300a and second sleeve section 300b. Sleeve 300 may be formed of any suitable type of material, such as, for example, canvas, silk, nylon, aramid fiber (e.g., KEVLAR®), polyethylene terephthalate, and/or the like. In various embodiments, sleeve 300 may formed of an elastomeric material such as such as, for example, rubber, synthetic rubber, silicone, or a polyether-polyurea copolymer such as Lycra®, Spandex, and/or Elastane First sleeve section 300a, second sleeve section 300b, and apex 354 may define an interior sleeve volume 350. At least a portion of secondary length 122 and primary length 121 may be located in interior sleeve volume 350. For example, in various embodiments, first portion 122a, second portion 122b, and third portion 122c of secondary length 122 may be located, at least, partially within interior sleeve volume 350. In various embodiments, sleeve 300 may be coupled to suspension line 120 via thread 352. Thread 352 may couple first sleeve section 300a and second sleeve section 300b to primary length 121. While FIG. 8B shows thread 352 extending through first sleeve section 300a, primary length 121, and second sleeve section 300b, it is contemplated and understood that, in various embodiments, thread 352 may be sewn between first sleeve section 300a and a first side of primary length 121, and a second thread may be sewn between second sleeve section 300b and a second, opposing side of primary length 121.

In accordance with various embodiments, the thread 352 may be configured to sever in response to the tensile force generated during extension of secondary length 122. A tensile strength of thread 352 is less than the force generated by secondary length 122 in response to the severing of bundling line 135. In this regard, stitching 352 may break in response to the severing of bundling line 135. In response to stitching 352 severing, first sleeve section 300a may translate away from second sleeve section 300b, thereby removing the frictional forces that hold secondary length 122 within sleeve 300. In this regard, secondary length 122 may translate out interior sleeve volume 350 in response to the breaking of stitching 352.

Opening sleeve 300 (i.e., separating first sleeve section 300a and/or second sleeve section 300b from primary length 121) may allow secondary length 122 to more easily deploy. Further, folding sleeve 300 and sewing first sleeve section 300b and/or second sleeve section 300b to primary length 121 after locating secondary length 122 over the inner surface of the sleeve 300 allows for easier assembly, as compared to conventional assembly methods where the secondary length is pulled through a sleeve that is already formed and attached to the primary length. Sewing first sleeve section 300a and/or second sleeve section 300b to primary length 121 after locating secondary length 122 in interior sleeve volume 350 also tends to better accommodate the additional thickness created by elastomeric insert 230, which may not fit into preformed, pre-sewn sleeves and/or may become tangled when pulling the secondary length through a preformed, pre-sewn sleeve.

Figure 9:
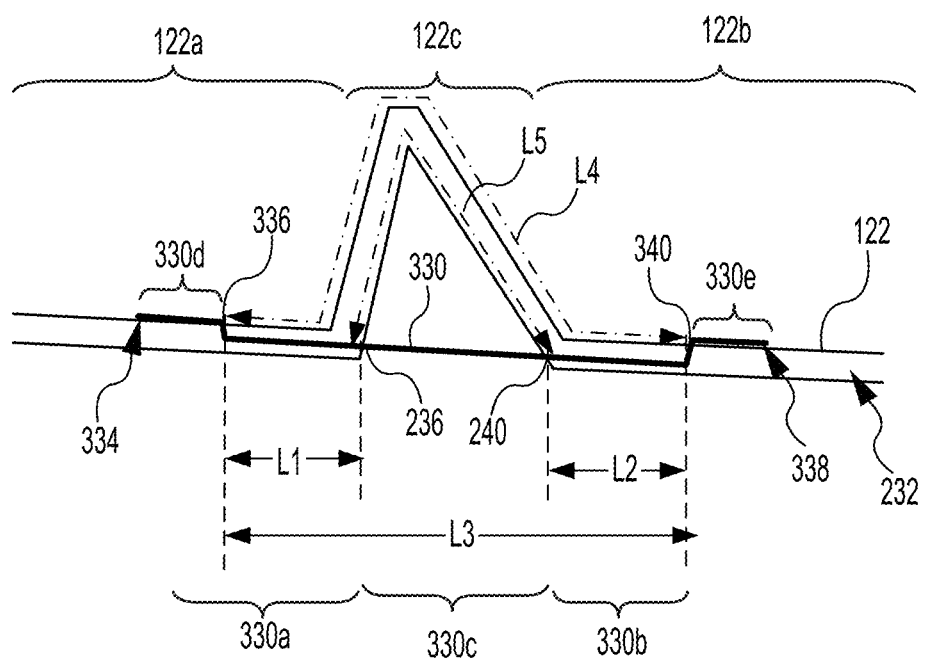
FIG. 9 illustrates a portion of a suspension line having an elastomeric insert coupled externally to the suspension line, in accordance with various embodiments.

With reference to FIG. 9, a portion of secondary length 122 including an elastomeric insert 330 is illustrated. In accordance with various embodiments, the secondary length 122 of one or more suspension line(s) 120 may include elastomeric insert 330 in place of, or in addition to, elastomeric insert 230 from FIG. 7. Elastomeric insert 330 may comprise a relatively flexible and/or elastomeric material such as, for example, rubber, synthetic rubber, silicone, or a polyether-polyurea copolymer (e.g., Lycra®, Spandex, and/or Elastane). In various embodiments, elastomeric insert 330 may comprise a tension spring. In various embodiments, at least, a portion of elastomeric insert 330 may be located in internal volume 232 of secondary length 122. For example, a first segment 330a and a second segment 330b of elastomeric insert 330 may be located in internal volume 232. In various embodiments, a third segment 330c, a fourth segment 330d, and a fifth segment 330e may be located outside (i.e., exterior to) internal volume 232. First segment 330a extends from opening 236 to an opening 336 in secondary length 122. Second segment 330b extends from opening 240 to an opening 340 in secondary length 122. Third segment 330c extends between opening 236 and opening 240 (i.e., between first segment 330a and second segment 330b of elastomeric insert 330). Fourth segment 330d extends between a first end 334 of elastomeric insert 330 and opening 336. Fifth segment 330e extends between a second end 338 of elastomeric insert 330 and opening 340.

In various embodiments, elastomeric insert 330 may be coupled to secondary length 122 via fourth segment 330d and fifth segment 330e. For example, fourth segment 330d and fifth segment 330e may each be coupled to secondary length 122 via adhesive and/or via a heat bonding. In various embodiments, fourth segment 330d and fifth segment 330e may each be coupled to secondary length 122 via crimping and/or knots formed by fourth segment 330d and fifth segment 330e. In this regard, the crimping and/or knots formed by fourth segment 330d and fifth segment 330e are configured to prevent fourth segment 330d and fifth segment 330e from translating, respectively, through opening 336 and opening 340.

In various embodiments, a length L1 of elastomeric insert 330 is at least 6.0 inches (15.24 cm). Length L1 is measured between opening 236 and opening 336. A length L2 of elastomeric insert 330, extending between opening 240 and opening 340, is at least 6.0 inches (15.24 cm). In accordance with various embodiments, when elastomeric insert 330 is in a non-extended stated, a length L3 of elastomeric insert 330, as measured between opening 336 and opening 340 is less than the length L4 of secondary length 122, as measured between opening 336 and opening 340. In accordance with various embodiments, as tension in secondary length 122 increases, first end 334, opening 236, and opening 336 translate away from second end 338, opening 240, and opening 340, thereby causing elastomeric insert 330 (e.g., first segment 330a, second segment 330b, and third segment 330c) to stretch and the length L3 of elastomeric insert 330 to increase. The material and length of elastomeric insert 330 are selected such that elastomeric insert 330 can stretch to the length L4 of secondary length 122 without breaking (i.e., length L3 may equal length L4). Stated differently, the length L5 of the third portion 122c of secondary length 122 (i.e., the length of secondary length 122 between opening 236 and opening 240) is equal to or less than the difference in the length L3 of elastomeric insert 330 in the unstretched stated and the length L3 of elastomeric insert 330 elastomeric insert 330 in the fully stretched state.

Figure 10A:
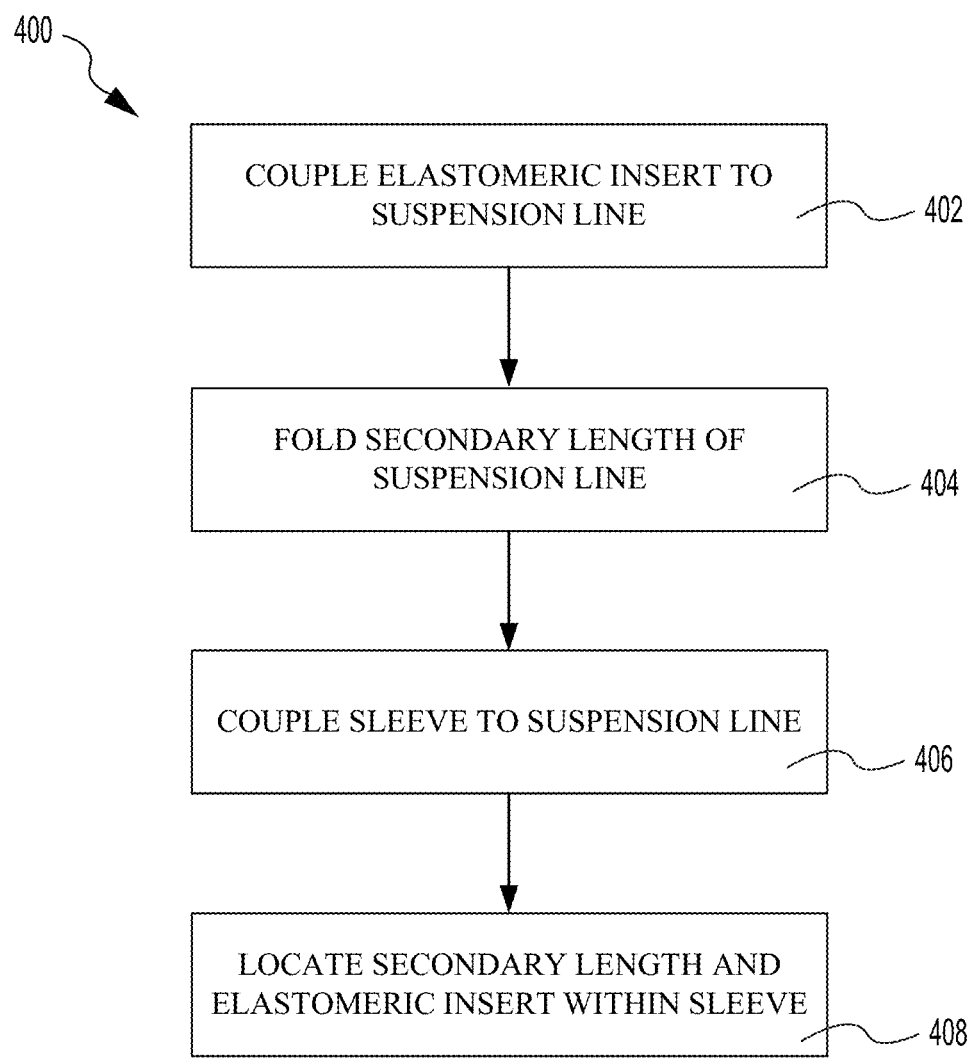
FIGS. 10A, 10B, and 10C illustrate a method of making a multi-staged drogue parachute assembly, in accordance with various embodiments.

With reference to FIG. 10A, a method 400 of making a multi-staged drogue parachute assembly is illustrated. In accordance with various embodiments, method 400 may comprise coupling an elastomeric insert to a suspension line (step 402). In various embodiments, the suspension line includes a primary length and secondary length. The elastomeric insert is coupled between a first portion of the secondary length and a second portion of the secondary length. Method 400 may further comprise folding the secondary length of the suspension line (step 404), coupling a sleeve to the suspension line (step 406), and locating the secondary length of the suspension line and the elastomeric insert within an interior volume of the sleeve (step 408).

Figure 10B:
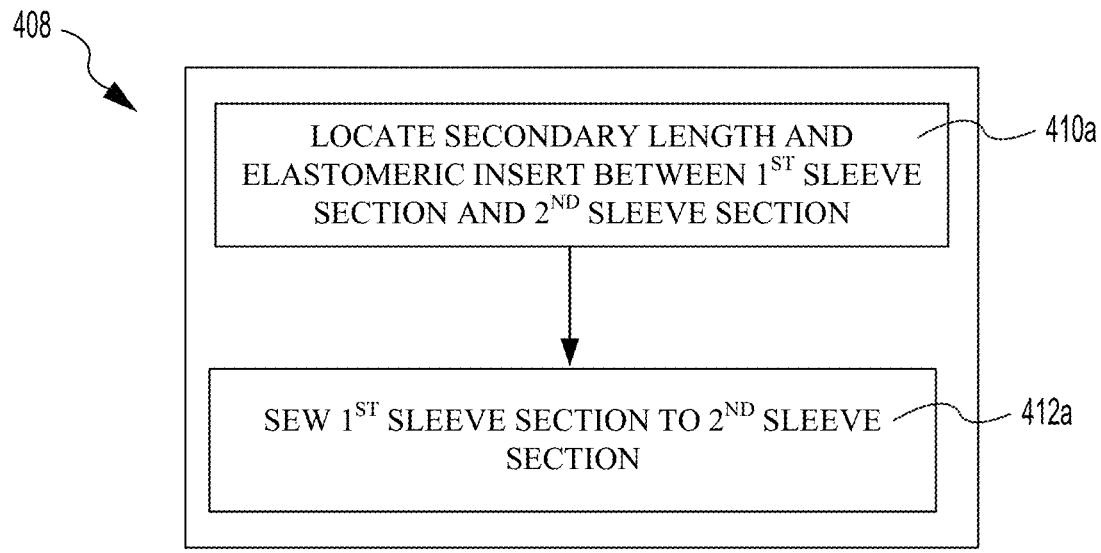

With reference to FIG. 10B, in various embodiments, step 408 may comprise locating the secondary length of the suspension line and the elastomeric insert between a first sleeve section and a second sleeve section (step 410a) and sewing the first sleeve section to the second sleeve section (step 412a). In various embodiments, step 412a occurs after step 410a (i.e., after locating the secondary length and the elastomeric insert between the first sleeve section and the second sleeve section).

Figure 10C:
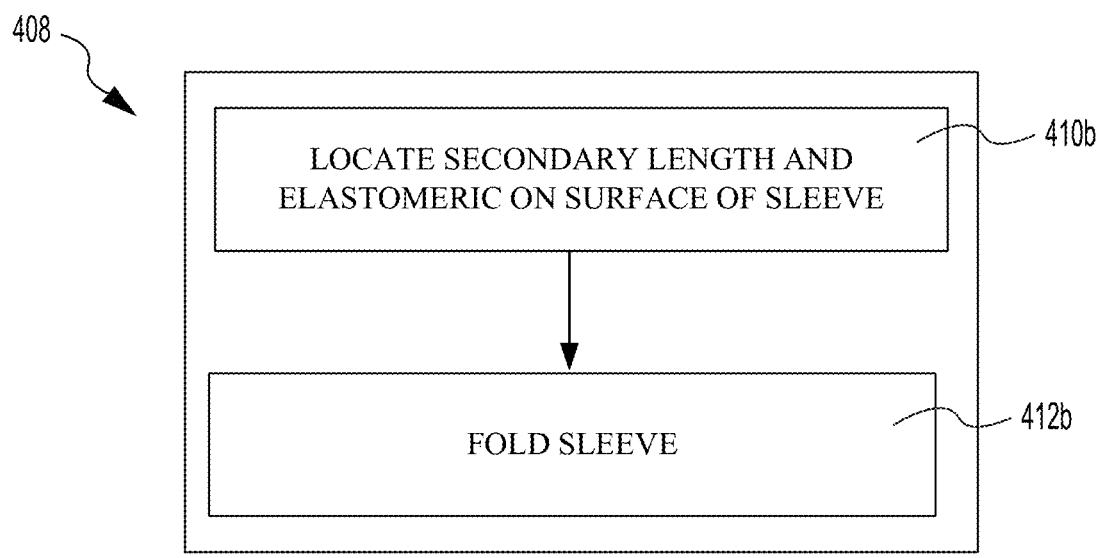

With reference to FIG. 10C, in various embodiments, step 408 may comprise locating the secondary length of the suspension line and the elastomeric insert on a inner surface of the sleeve (step 410b) and folding the sleeve to form a first sleeve section and a second sleeve section connected by an apex (step 412b).

In various embodiments, step 406 may include sewing the first sleeve section and the second sleeve section to the primary length of the suspension line. In various embodiments, at least one of the first sleeve section or the second sleeve section is sewn to the primary length after steps 410b and 412b. For example, with combined reference to FIGS. 10A and 10C, in various embodiments, step 406 may comprise sewing a first sleeve section to the primary length of the suspension line. Step 410b may comprise locating the secondary length of the suspension line and the elastomeric insert on a surface of the first sleeve section. Step 410b may be performed after step 406. Step 412b may comprise folding a second sleeve section over the secondary length of the suspension line, the elastomeric insert, and the first sleeve section to form an apex connecting the first sleeve section and the second sleeve section. Step 412b is performed after step 410b. After step 412b, the second sleeve section is sewn to the primary length of the suspension line.

In various embodiments, the secondary length may be located on the first sleeve section, then the sleeve may be folder over the over the secondary length, the elastomeric insert, and the first sleeve section to form an apex connecting the first sleeve section and the second sleeve section, and then both the first sleeve section and the second sleeve section are sewn to the primary length.

In various embodiments, step 402 comprises locating a first segment of the elastomeric insert and a second segment of the elastomeric within an internal volume of the secondary portion of the suspension line with a third segment of the elastomeric insert located external to the suspension line. The third segment of the elastomeric insert extends between the first segment and the second segment of the elastomeric insert.

In various embodiments, step 402 may further comprise sewing the first segment and/or the second segment to the suspension line.

In various embodiments, step 402 may further comprise locating a fourth segment of the elastomeric insert outside the suspension line with the fourth segment extending from the first segment to a first end of the elastomeric insert, and locating a fifth segment of the elastomeric insert outside the suspension line with the fifth segment extending from the second segment to a second end of the elastomeric insert.

In various embodiments, step 402 may include coupling the fourth segment of the elastomeric insert to the suspension line by forming at least one of a crimp or a knot in the fourth segment, the at least one of the crimp or the knot being configured to prevent the fourth segment from translating into the internal volume of the suspension line. In various embodiments, step 402 may include coupling the fifth segment of the elastomeric insert to the suspension line by forming at least one of a crimp or a knot in the fifth segment, the at least one of the crimp or the knot being configured to prevent the fifth segment from translating into the internal volume of the suspension line.

In various embodiments, step 402 may include coupling the fourth segment and/or the fifth segment to the suspension line using adhesive and/or heat bonding.

With reference to FIG. 11A, a method 450 of testing a multi-staged drogue parachute assembly is illustrated. In accordance with various embodiments, method 450 may comprise deploying a primary length of a suspension line of the multi-staged drogue parachute assembly (step 452) and increasing a tensile load applied to the sleeve (step 454). Method 450 further includes severing a coupling between the first sleeve section and the second sleeve section in response to the tensile load applied to the sleeve exceeding a threshold tensile load (step 456) and deploying the secondary length of the suspension line (step 458).

Figure 11:
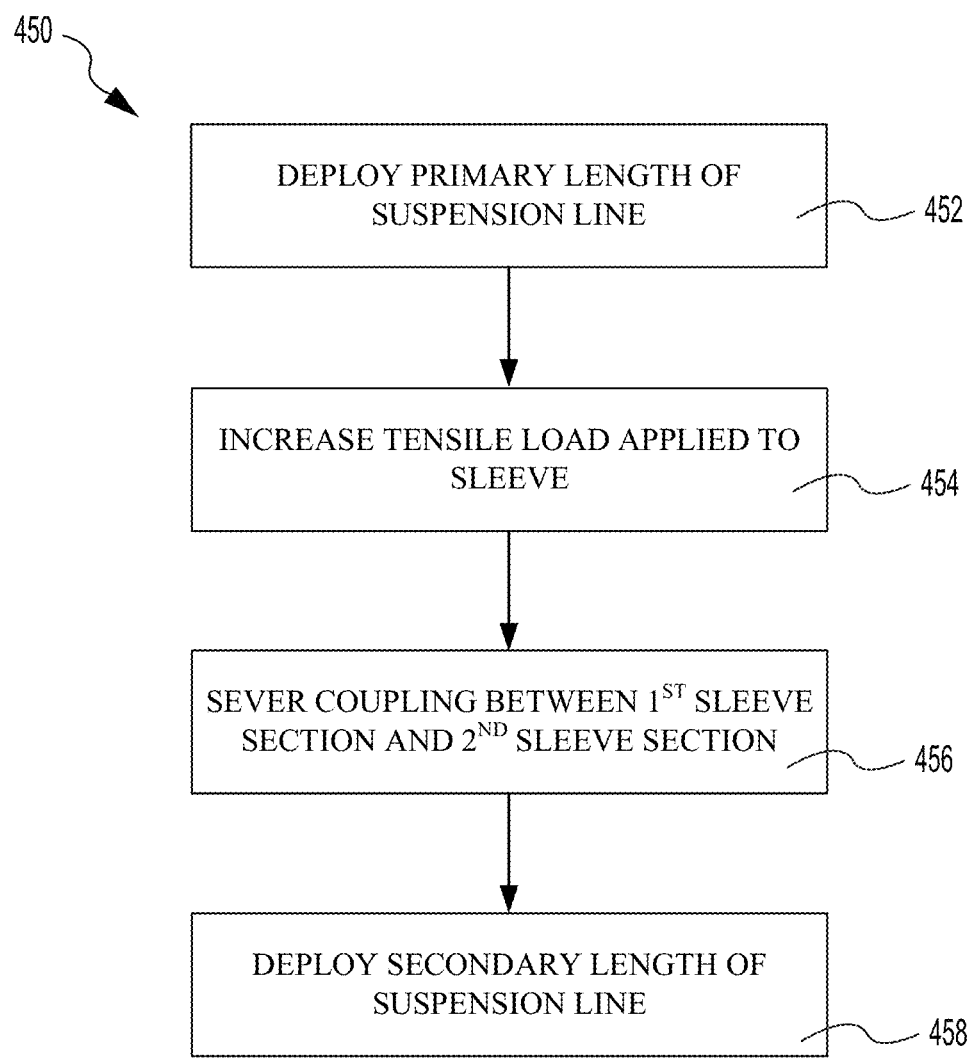
FIG. 11 illustrates a method of testing a multi-staged drogue parachute assembly, in accordance with various embodiments.

With combined reference to FIG. 11 and FIG. 2A, step 452 may comprise deploying primary length 121 of a suspension line 120 of the multi-staged drogue parachute assembly 100 (step 452). With combined reference to FIG. 11, FIG. 2A, FIG. 6A, and FIG. 6B, in accordance with various embodiments, the multi-staged drogue parachute assembly 100 includes the suspension line 120, an elastomeric insert 230, and a sleeve 200. The suspension line 120 includes the primary length 121 and a secondary length 122. The elastomeric insert 230 is coupled between a first portion 122*a* of the secondary length of the suspension line and a second portion 122*b* of the secondary length. The sleeve 200 is coupled to the primary length 121 of the suspension line. The sleeve 200 includes a first sleeve section 200*a* and a second sleeve section 200*b*. The first portion 122*a* and the second portion 122*b* of the secondary length 122 are located with an interior volume 250 defined by the first sleeve section 200*a* and the second sleeve section 200*b* during deployment of the primary length 121 of the suspension line 120.

Step 454 may include increasing a tensile load applied to the sleeve 200. Step 456 may include severing a coupling between the first sleeve section 200*a* and the second sleeve section 200*b* in response to the tensile load applied to the sleeve 200 exceeding a threshold tensile load. In various embodiments, the coupling may be a thread, such as thread 254. In various embodiments, the coupling may be an adhesive or any other suitable coupling capable of severing to allow first sleeve section 200 to separate from second sleeve section 200*b*. Step 458 may comprise deploying the secondary length 122 of the suspension line 120.

With combined reference to FIG. 11, FIG. 4, FIG. 6A, and FIG. 6B, in various embodiments, method 450 may further comprise severing a bundling line coupled to the primary length 121 of the suspension line. The bunding line is severed after deployment of the primary length (i.e., after step 452). For example, after primary 121 is deployed, bunding line 135 is severed. In response to severing the bundling line 135, a tensile load is applied to the sleeve 200 by the secondary length 122 of the suspension line 120.

In various embodiments, the coupling between the first sleeve section and the second sleeve section comprises a first thread (e.g., thread 254) sewn between the first sleeve section 200*a* and the second sleeve section 200*b*. In various embodiments, multi-staged drogue parachute assembly 100 further comprises a second thread (e.g., thread 252) sewn between the primary length of the suspension line and at least one of the first sleeve section 200*a* or the second sleeve section 200*b*.

With combined reference to FIG. 11, FIG. 8A, and FIG. 8B, in various embodiments, step 456 comprises severing a thread (e.g., thread 352) sewn between the primary length 121 of the suspension line and at least one of the first sleeve section 300*a* or the second sleeve section 300*b*.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-staged drogue parachute assembly, comprising:
a suspension line including a primary length and a secondary length, wherein the secondary length is folded;
an elastomeric insert coupled between a first portion of the secondary length and a second portion of the secondary length; and
a sleeve coupled to the primary length of the suspension line, wherein the sleeve includes a first sleeve section and a second sleeve section, and wherein the first portion of the secondary length and the second portion of the secondary length are located with an interior volume defined by the first sleeve section and the second sleeve section.

2. The multi-staged drogue parachute assembly of claim 1, further comprising
a bundling line coupled to the suspension line, wherein the bundling line is configured to secure the secondary length; and
a cutter configured to sever the bundling line and release the secondary length.

3. The multi-staged drogue parachute assembly of claim 2, further comprising:
a first thread coupling at least one of the first sleeve section or the second sleeve section to the primary length; and
a second thread coupling the first sleeve section to the second sleeve section.

4. The multi-staged drogue parachute assembly of claim 2, further comprising a thread coupling at least one of the first sleeve section or the second sleeve section to the primary length, wherein the sleeve is folded to form an apex connecting the first sleeve section and the second sleeve section.

5. The multi-staged drogue parachute assembly of claim 1, wherein at least a portion of the elastomeric insert is located within an internal volume of the secondary length.

6. The multi-staged drogue parachute assembly of claim 1, further comprising:
a first stitching coupling a first segment of the elastomeric insert to the first portion of the secondary length; and
a second stitching coupling a second segment of the elastomeric insert to the second portion of the secondary length.

7. The multi-staged drogue parachute assembly of claim 6, wherein a third segment of the elastomeric insert is located external to the suspension line, the third segment extending between the first segment and the second segment.

8. The multi-staged drogue parachute assembly of claim 1, wherein the elastomeric insert includes:
a first segment located within an internal volume of the suspension line;
a second segment located within the internal volume of the suspension line;
a third segment located external to the suspension line and extending between the first segment and the second segment;
a fourth segment located external to the suspension line and extending from the first segment to a first end of the elastomeric insert; and
a fifth segment located external to the suspension line and extending from the second segment to a second end of the elastomeric insert.

9. The multi-staged drogue parachute assembly of claim 8, wherein the fourth segment is coupled to the suspension line by at least one of an adhesive or a heat bonding.

10. The multi-staged drogue parachute assembly of claim 8, wherein the fourth segment includes at least one of a crimp or a knot configured to block the fourth segment from translating into the internal volume of the secondary length.

11. An ejection system, comprising:
an ejection seat; and
a multi-staged drogue parachute assembly coupled to the ejection seat, the multi-staged drogue parachute assembly, comprising:
a canopy;
a suspension line coupled to the canopy, the suspension line including a primary length and a secondary length, wherein the secondary length is folded;
an elastomeric insert coupled between a first portion of the secondary length and a second portion of the secondary length;
a sleeve coupled to the primary length of the suspension line, the sleeve including a first sleeve section and a second sleeve section, wherein the first portion of the secondary length and the second portion of the secondary length are located with an interior volume defined by the first sleeve section and the second sleeve section; and
a riser coupled between the suspension line and the ejection seat.

12. The ejection system of claim 11, wherein the multi-staged drogue parachute assembly further comprises:
a bundling line coupled to the suspension line, wherein the bundling line is configured to secure the secondary length; and
a cutter configured to sever the bundling line and release the secondary length.

13. The ejection system of claim 11, wherein the multi-staged drogue parachute assembly further comprises:
a first thread coupling the first sleeve section and the second sleeve section to the primary length; and
a second thread coupling the first sleeve section to the second sleeve section.

14. The ejection system of claim 11, wherein the multi-staged drogue parachute assembly further comprises a thread coupling at least one of the first sleeve section or the second sleeve section to the primary length, and wherein the sleeve is folded to form an apex connecting the first sleeve section and the second sleeve section.

15. The ejection system of claim 13, wherein at least a portion of the elastomeric insert is located within an internal volume of the secondary length.

16. A method of testing a multi-staged drogue parachute assembly, comprising:
deploying a primary length of a suspension line of the multi-staged drogue parachute assembly, wherein the multi-staged drogue parachute assembly includes:
the suspension line, wherein the suspension line comprises the primary length and a secondary length,
an elastomeric insert coupled between a first portion of the secondary length and a second portion of the secondary length, and
a sleeve coupled to the primary length of the suspension line, wherein the sleeve includes a first sleeve section and a second sleeve section, and wherein the first portion of the secondary length and the second portion of the secondary length are located with an interior volume defined by the first sleeve section and the second sleeve section during deployment of the primary length of the suspension line;
increasing a tensile load applied to the sleeve;
severing a coupling between the first sleeve section and the second sleeve section in response to the tensile load applied to the sleeve exceeding a threshold tensile load; and
deploying the secondary length of the suspension line.

17. The method of claim 16, further comprising severing a bundling line coupled to the primary length of the suspension line, wherein in response to severing the bundling line, the tensile load is applied to the sleeve by the secondary length of the suspension line.

18. The method of claim 17, wherein the coupling between the first sleeve section and the second sleeve section comprises a first thread sewn between the first sleeve section and the second sleeve section.

19. The method of claim 18, wherein the multi-staged drogue parachute assembly further comprises a second thread sewn between the primary length of the suspension line and at least one of the first sleeve section or the second sleeve section.

20. The method of claim 16, wherein severing the coupling between the first sleeve section and the second sleeve section comprises severing a thread sewn between the primary length of the suspension line and at least one of the first sleeve section or the second sleeve section.

* * * * *